United States Patent
Rintoul et al.

(10) Patent No.: US 10,801,841 B1
(45) Date of Patent: Oct. 13, 2020

(54) TRAJECTORY PREDICTION VIA A FEATURE VECTOR APPROACH

(71) Applicant: National Technology & Engineering Solutions of Sandia, LLC, Albuquerque, NM (US)

(72) Inventors: Mark Daniel Rintoul, Albuquerque, NM (US); Andrew T. Wilson, Albuquerque, NM (US); Christopher G. Valicka, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 578 days.

(21) Appl. No.: 15/454,812

(22) Filed: Mar. 9, 2017

Related U.S. Application Data (63) Continuation-in-part of application No. 14/927,083, filed on Oct. 29, 2015, now Pat. No. 10,345,106.
(Continued)

(51) Int. Cl.
  *G01C 21/20* (2006.01)
  *G01C 21/30* (2006.01)
  *G01C 21/00* (2006.01)
(52) U.S. Cl.
  CPC .......... *G01C 21/20* (2013.01); *G01C 21/005* (2013.01); *G01C 21/30* (2013.01)
(58) Field of Classification Search
  CPC ........ G01C 21/20; G01C 9/005; G01C 11/28; G01C 21/32; G01C 21/3415;
(Continued)

(56) References Cited

U.S. PATENT DOCUMENTS 5,842,142 A * 11/1998 Murray .................. G01C 21/00
                                                                    701/16
6,873,903 B2    3/2005 Baiada et al.
(Continued)

OTHER PUBLICATIONS

Gariel et al; Trajectory Clustering and an Application to Airspace Monitoring, (Year: 2011).*
(Continued)

*Primary Examiner* — Gregory J Toatley, Jr.
*Assistant Examiner* — Lynda Dinh
(74) *Attorney, Agent, or Firm* — Madelynne J. Farber; Mark A. Dodd (57) ABSTRACT

Described herein are various technologies pertaining to extracting one or more features from trajectory data recorded during motion of a body, and further, generating a n-dimensional feature vector based upon the one or more extracted features. The n-dimensional feature vector enables expedited analysis of the trajectory data from which the feature vector was generated. For example, rather than having to analyze a trajectory curve comprising a large number of time-position data points, the n-dimensional feature vector can be compared with one or more search parameters to facilitate clustering of the trajectory data associated with the n-dimensional feature vector with other trajectory data which also satisfies the search request. The trajectory data can be plotted on a screen in combination with the n-dimensional feature vector, and other pertinent information. The trajectory data, etc., can be displayed using heat maps or other graphical representation.

20 Claims, 7 Drawing Sheets

Related U.S. Application Data (60) Provisional application No. 62/322,031, filed on Apr. 13, 2016.

(58) Field of Classification Search
CPC .... G01C 21/3492; G01C 23/00; G01C 21/30; G01C 21/005
See application file for complete search history.

(56) References Cited

U.S. PATENT DOCUMENTS

| | | | |
|---|---|---|---|
| 8,798,898 B2 | 8/2014 | Castillo-Effen et al. | |
| 8,963,742 B1* | 2/2015 | Seah | G01C 23/00 340/971 |
| 9,248,834 B1* | 2/2016 | Ferguson | B60W 30/0956 |
| 2008/0004792 A1* | 1/2008 | Wise | G08G 5/0043 701/120 |
| 2012/0179368 A1* | 7/2012 | Walter | G08G 5/0034 701/465 |
| 2014/0163850 A1* | 6/2014 | Sawhill | G08G 5/0013 701/120 |
| 2015/0378358 A1* | 12/2015 | Gutierrez-Castaneda | G05D 1/0607 701/8 |
| 2016/0054135 A1* | 2/2016 | Fowe | G01C 21/34 701/117 |
| 2017/0337829 A1* | 11/2017 | Brandao | G08G 5/0008 |

OTHER PUBLICATIONS

Thippavong, et al., "Adaptive Algorithm to Improve Trajectory Prediction Accuracy of Climbing Aircraft", Journal of Guidance, Control and Dynamics, Jan.-Feb. 2013, vol. 36, No. 1, pp. 15-24.

Gong, et. al., "A Methodology for Automated Trajectory Prediction Analysis", American Institute of Aeronautics and Astronautics AIAA Guidance, Navigation, and Control Conference and Exhibit, Aug. 2004, pp. 1-14.

Hamed, et al., "Statistical prediction of aircraft trajectory: regression methods vs point-mass model", Air Traffic Management ATM 2013, 10th USA/Europe Air Traffic Management Research and Development Seminar, Jun. 2013, pp. 1-10.

Sharma, et al., "Gradient Descent Feed Forward Neural Networks for Forecasting the Trajectories", International Journal of Advanced Science and Technology, vol. 34, Sep. 2011, pp. 1-6.

Swierstra, et. al., "A Common Trajectory Prediction Capability for Decision Support Tools", 5th USA/Europe Air Traffic Management ATM 2003 R&D Seminar, Jun. 2003, pp. 1-10.

* cited by examiner

TRAJECTORY PREDICTION VIA A FEATURE VECTOR APPROACH

RELATED APPLICATION

This application claims priority to U.S. Provisional Patent Application No. 62/322,031, filed on Apr. 13, 2016, entitled "TRAJECTORY PREDICTION VIA A FEATURE VECTOR APPROACH". This application is also a continuation in part of U.S. patent application Ser. No. 14/927,083, filed on Oct. 29, 2015, entitled "TRAJECTORY ANALYSIS WITH GEOMETRIC FEATURES". The entireties of these applications are incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Trajectory data for a moving body comprises huge amounts of data to enable plotting/reproduction of a trajectory for which the data has been collected. For example, trajectory data for an aircraft that flew internationally and further was placed in a lengthy holding pattern prior to landing can comprise hundreds/thousands of data points. When trajectory data is compiled for a plurality of aircraft flights occurring for a particular duration, e.g., monitoring all flights arriving at a particular airport for a year, the total trajectory data can collectively include billions of data points. Accordingly, analysis of the trajectory data to identify, for example, flights having a similar flight path, can be computationally intensive. Further, "noise" in the trajectory data can imbue the trajectory data with a level of uncertainty that can skew analysis of the data.

SUMMARY

The following is a brief summary of subject matter that is described in greater detail herein. This summary is not intended to be limiting as to the scope of the claims.

Described herein are various technologies related to extracting one or more features from trajectory data recorded during motion of a body, and further, generating a n-dimensional feature vector based upon the one or more extracted features. The n-dimensional feature vector enables expedited analysis of the trajectory data from which the feature vector was generated. For example, rather than having to analyze a trajectory curve comprising a large number of time-position data points, the n-dimensional feature vector can be compared with one or more search parameters to facilitate clustering of the trajectory data associated with the n-dimensional feature vector with other trajectory data which also satisfies the search request. The trajectory data can be plotted on a screen in combination with the n-dimensional feature vector, and other pertinent information. The trajectory data, etc., can be displayed using heat maps or other graphical representation.

Conventional analysis of trajectory data may require the trajectory curve to be assembled from the trajectory data, and subsequently perform curve analysis of the trajectory curve. However, such an approach can be computationally costly. By generating a n-dimensional feature vector for the trajectory data, any analysis of the trajectory data can be performed based upon analysis of the one or more features from which the n-dimensional feature vector was formed. For example, trajectory data for an international flight can include millions of data points, while it may be possible to extract 17 features from the trajectory data, a 17-dimensional feature vector can be generated from the extracted features, and subsequently, only the 17-dimensional feature vector has to be analyzed as opposed to the millions of data points for the trajectory.

In an embodiment, the n-dimensional feature vector enables the trajectory data from which it was formed to be clustered with other trajectory data. For example, a request can be received at the computer system, requesting trajectories to be found that match a particular requirement (e.g., total distance of flight, including any holding patterns, flight path diversions, etc.). Alternatively, the generated n-dimensional feature vector can be compared with another n-dimensional feature vector to determine whether the generated n-dimensional feature vector and the n-dimensional feature vector are the same/similar, or not. In the event of the generated n-dimensional feature vector and the n-dimensional feature vector being comparable, the n-dimensional feature vector can be "clustered" with the generated n-dimensional feature vector. A notification can be generated indicating whether a n-dimensional feature vector(s) was identified to match the generated n-dimensional feature vector, or no comparable n-dimensional feature vector was found.

In a further embodiment, one or more trajectories can be presented on a display device, wherein graphical representation techniques such as a heatmap can be utilized to provide further information about a trajectory/trajectories. Other representation of a trajectory can be utilized such as a received instruction defining one or more colors for which a trajectory (or portion thereof) is to be presented on a display device. Such instructions can include line width of a line depicting the trajectory, a first color for a first portion of a trajectory, a second color for a second portion of the trajectory, coloration indicating a degree of measure, e.g., different line color for maximum altitude of a trajectory, etc.

In another embodiment, one or more algorithms can be utilized to control presentation of a trajectory, wherein the one or more algorithms can adjust display of a trajectory based upon a position of the earth over which the trajectory was recorded (e.g., latitude/longitude correction), to compensate for one or more characteristics of the display device, e.g., a display device having a two dimensional display surface compared with presentation on a display device having a spherical display surface.

In a further embodiment, a prediction can be generated identifying where a trajectory, that is currently being derived from a body in motion, is destined to end given early point(s) observation(s) of the current trajectory and a history of previous trajectory observations. A database of previously recorded trajectories can be processed by generating predefined sub-trajectories from the recorded trajectories and extracting one or more feature vectors associated with the sub-trajectories. For example, a sub-trajectory can be a portion of the overall recorded trajectory, e.g., an initial 10%, a middle portion, etc. The feature vectors and the destinations associated with the sub-trajectories can be stored in a database that has a spatial indexing capability. Further, a metric can be applied that can describe a distance between separate points. Based thereon, data can be received for a body that is currently in motion, e.g., an aircraft, wherein a feature vector(s) can be derived for the current trajectory being traversed by the aircraft. The feature vector(s) of the current trajectory can be compared with the feature vectors of the sub-trajectories, and based upon any matches found between the feature vector(s) of the current trajectory and the feature vectors of the sub-trajectories, one or more sub-trajectories can be extracted, the destination of the trajectory from which the sub-trajectory was obtained can be determined, and hence, a destination for the current trajectory derived. The feature vectors of the sub-trajectories can be weighted with regard to feature distance from the current trajectory, time-of-day recorded, day-of-week recorded, duration, velocity, etc.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies are presented herein pertaining to vector representation of trajectory data, and various operations that can be performed on the vector representation, wherein like reference numerals are used to refer to like elements throughout. In an embodiment, a destination of a body currently in motion can be determined by comparison with feature vectors generated from trajectories having a known destination with a feature vector generated from a trajectory being generated from data being captured from the body currently in motion. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Figure 1:
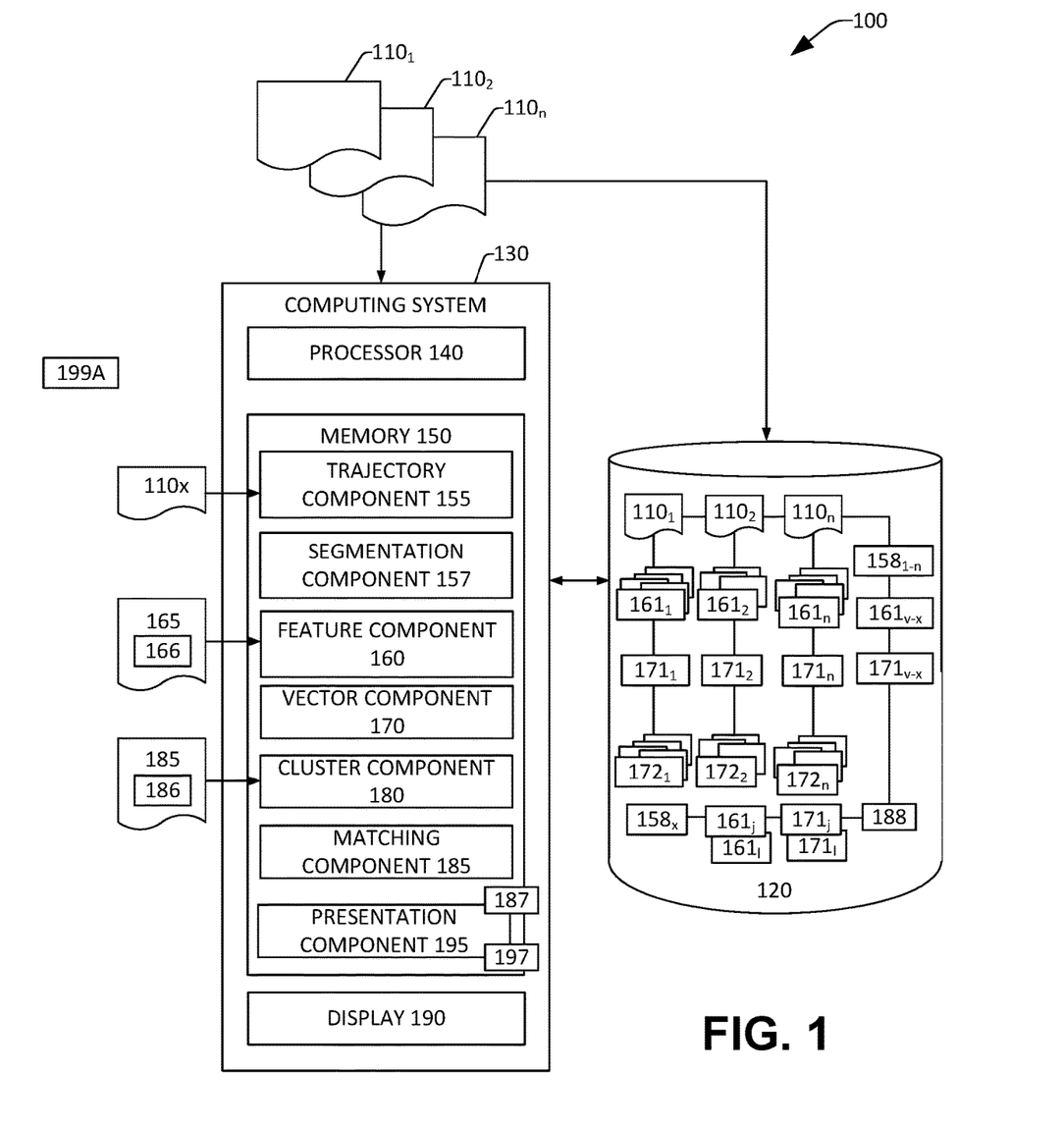
FIG. 1 is a schematic illustrating an exemplary system for conversion of trajectory data to a n-dimensional feature vector and analysis of one or more n-dimensional vectors.

FIG. 1 illustrates an exemplary system 100 that can be utilized to generate a vector representation of trajectory data, and further conduct one or more operations with the vector representation. Trajectory data comprises a set of points in time and space (e.g., time-series positional coordinates) from which a trajectory, or motion, of a body can be presented (e.g., on a display). The system 100 comprises a plurality of data instances compiled for a plurality of trajectories captured for motions of one or more bodies, data $110_1$-$110_n$, where n is an integer greater than 1. The bodies can be any object that has undergone/undergoing motion, such as an aircraft, a watercraft, a vehicle, a person, an animal, a ball, a projectile, an object, etc. Also, the trajectory can be data captured relating to motion of an eyeball with regard to one or more objects presented on a display screen and the according focus of attention on a particular coordinate(s) of the display screen (e.g., gaze tracking), where the one or more objects are statically placed on or are in motion across the display screen. For example, such trajectory data can be captured by an entity placing one or more advertisements on a screen and gaze tracking is performed to determine an interest of a viewer with respect to the one or more advertisements presented on the display screen. As previously mentioned, a large volume of data (e.g., millions of datapoints) can be compiled for motion of a body along a given trajectory, and thus, analysis of trajectory data compiled for a large number of bodies can be computationally intense. As shown in FIG. 1, the trajectory data $110_1$-$110_n$ can be stored in a data store 120. Each of the trajectory data $110_1$-$110_n$ can be in any format, e.g., text, extensible markup language (XML), comma separated value (CSV), etc.

The system 100 further comprises a computing system 130 which can be configured to receive and/or retrieve trajectory data $110_1$-$110_n$, e.g., from the data store 120.

The computing system 130 comprises a processor 140 and memory 150, wherein the memory 150 comprises data that is accessible to the processor 140 and instructions that can be executed by the processor 140. With more particularity, the memory 150 comprises a trajectory component 155 that is configured to perform one or more functions on an instance of trajectory data (e.g., any of trajectory data $110_1$-$110_n$). For example, the trajectory component 155 can provide one or more identifiers/labels to the trajectory data, such as departure location, destination location, flight number, ship number, vehicle identification number, name of person being monitored, a timestamp for duration of motion, motion start time, motion end time, etc. Further, the trajectory component 155 can review an instance of trajectory data to determine whether the trajectory data comprises a single journey (or motion) of a body, or a plurality of journeys. For example, the trajectory component 155 can review an instance of trajectory data to determine whether the body was at rest for a certain amount of time, and rather than the body being considered to have undertaken one journey (per the single instance of trajectory data), the trajectory data includes more than one journey for the body. For example, if a body is at rest for longer than a definable time period, TP, (e.g., TP=20 minutes) then the trajectory data is determined to include a first journey, a rest duration, and a second duration. The trajectory component 155 can be configured to separate the trajectory data into two portions, a first portion for the first journey and a second portion for the second journey, and apply any pertinent identifiers (e.g., flight number) to both the first portion and second portion of trajectory data. The instances of trajectory data $110_1$-$110_n$ can be updated to include the newly created second portion, e.g., as $110_x$.

The memory further comprises a feature component 160 that is configured to identify, generate and/or extract one or more features $161_1$-$161_n$ from an instance of trajectory data, e.g., any of trajectory data $110_1$-$110_n$. A feature is a parameter or quality which is included in, or can be determined from data points (e.g., time-position series of points recorded for a trajectory) included in an instance of trajectory data. A value can be ascribed to a feature. For example, a feature "highest altitude" can be obtained from trajectory data obtained for a flight of an aircraft, wherein the highest value in the time-position series of points in the trajectory data (e.g., 27,000 feet) can be identified and assigned to the highest altitude feature. Thus, trajectory data can be processed by the feature component 160, with one or more features being extracted, which can be further utilized to identify a trajectory having a particular characteristic(s).

The one or more features $161_1$-$161_n$ can be user defined. For example, a user can identify 12 features (parameters) that they would like the respective trajectory data (e.g., any of trajectory data $110_1$-$110_n$) to be represented be a feature vector, hence the generated feature vectors will be 12-dimensional feature vectors. A feature request 165 can be received at the feature component 160, wherein the feature request 165 includes the 12 required features in definition 166. The feature component 160 can be configured to extract the 12 required features from the trajectory data.

The memory 150 also comprises a vector component 170 that is configured to generate an n-dimensional feature vector from the one or more features extracted (e.g., per the feature request 165) for an instance of trajectory data, e.g., any of the features $161_1$-$161_n$. For example, the vector component 170 generates a first n-dimensional feature vector $171_1$ from the features $161_1$ extracted for trajectory data $110_1$, a second n-dimensional feature vector. $171_2$ from the features $161_2$ extracted for trajectory data $110_2$, an $n^{th}$-dimensional feature vector. $171_n$ from the features $161_n$ extracted for trajectory data $110_n$. The n-dimensional feature vectors $171_1$-$171_n$ can be stored in the data store 120 for subsequent retrieval and analysis.

The trajectory component 155, the feature component 160 and/or the vector component 170 can be configured to read the trajectory data $110_1$-$110_n$ in its original format (e.g., text, CSV, etc.) and generate the n-dimensional feature vectors $171_1$-$171_n$.

The memory 150 further comprises a cluster component 180 that is configured to receive a search request 185, analyze the n-dimensional feature vectors $171_1$-$171_n$ (e.g., stored in the data store 120), and further determine whether any of the n-dimensional feature vectors $171_1$-$171_n$ satisfies the search request 185. In response to determining that one or more of the n-dimensional feature vectors $171_1$-$171_n$ satisfy the search request 185, any of the one or more of the n-dimensional feature vectors $171_1$-$171_n$, which satisfy the search request 185 can be "clustered" with (associated with, stored with, combined with, attached to) the search request 185. For example, the search request 185 comprises a search criteria 186 "do any of the n-dimensional feature vectors $171_1$-$171_n$ have the same or similar n-dimensional feature vector as a search feature vector x?" Wherein, any of the n-dimensional feature vectors $171_1$-$171_n$ which meet the search criteria 186 can be clustered with the search feature vector x, and any information pertaining thereto. The cluster component 180 can be further configured to, in response to determining that one or more n-dimensional feature vectors $171_1$-$171_n$ were classified as being the same as/similar to the n-dimensional feature vector 186, generate an indicator 187 as to which of the n-dimensional feature vectors $171_1$-$171_n$ were classified as being the same as/similar to the n-dimensional feature vector 186. The cluster component 180 can also be configured to, in response to determining that none of the n-dimensional feature vectors $171_1$-$171_n$ were classified as being the same as/similar to the n-dimensional feature vector 186, generate an indicator 187 reciting that no matches were found for the n-dimensional feature vector 186. Generation and storage of a "no matches found" indicator 187 can expedite a subsequent search as a message can be presented to a user submitting a search request 185 that a previously executed search request contained search criteria similar to search criteria 186, and no matches were found.

In another search example, the search request 185 can include a criteria 186 to identify (cluster) flights that have a particular duration, a particular flight distance, etc., where such requests can be complied with by the cluster component 180 reviewing one or more of the features $161_1$-$161_n$ extracted from one or more instances of trajectory data $110_1$-$110_n$.

The computing system 130 further comprises a display 190 that is in communication with the processor 140, wherein the display 190 can display data, information, etc., pertaining to an n-dimensional feature vector, and the trajectory data from which it was generated. The memory 150 comprises a presentation component 195 which is configured to control how an n-dimensional feature vector, the trajectory data from which it was generated, extracted features, and other pertinent data/information are presented on the display 190.

Operation of the system 100 is now set forth. As previously mentioned, trajectory data can include a very large amount of data (e.g., data comprises points in space and time) to enable depiction of the trajectory on a display (e.g., display 190). Hence, comparison between first trajectory data describing/depicting motion of a first body and second trajectory data describing/depicting motion of a second body can be computationally intensive. Further, while two trajectories may be similar for a large portion of the respective trajectories, for a particular portion the trajectories may be sufficiently dissimilar that an automated search system would not consider the two trajectories to be related, even though the two flights utilized the same departure airports and the same destination airports. For example, a first aircraft flies directly from a departure airport to a destination airport. However, a second aircraft has its flight undertake a detour (e.g., to avoid bad weather) and further, may have been placed in a lengthy holding pattern prior to landing. Hence, direct comparison of the first trajectory and the second trajectory could determine the two trajectories to be different.

Thus, rather than directly comparing first trajectory data with second trajectory data, an approach is required to reduce the complexity of such comparison. As mentioned, a feature component 160 can be configured to generate one or more features from a set of trajectory data, wherein the one or more features can be considered to be metadata of respective trajectory data. Features comprise numerical values associated with one or more parameters of interest for the trajectory data. For example, in a non-exhaustive list, features can include: an end-to-end distance of the flight, a total distance traveled (length of trajectory), distance from a given fixed point or set of points, a starting point, an end point, a start timestamp, an end timestamp, a timestamp for duration of motion, speed of motion, average speed of motion, maximum speed of motion, heading(s), a vehicle identifier (e.g., an aircraft tail number/empennage number, an aircraft fuselage number, a ship identification number, a vehicle registration plate), climb rate, a centroid of points, a total curvature, a total turning average, curvature average, turning area of a convex hull of the points, aspect ratio of a convex hull, perimeter length of a convex hull, centroid of a convex hull, ratio of end-to-end distance vs. total distance traveled, radius of gyration of the points, intratrajectory distances (distance geometry approaches), etc. The various points (e.g., starting point, end point, etc.) can be represented by any suitable representation, e.g., longitude coordinate, latitude coordinate, etc.

A number of the features $161_1$-$161_n$ are derived data $172_1$-$172_n$ that is derived from the trajectory data $110_1$-$110_n$. For example, climb rate for an aircraft may not be known directly and rather is derived based upon analyzing a number of points comprising the trajectory data $110_1$-$110_n$. Any derived data $172_1$-$172_n$, e.g., the derived climb rate, can be attached to the various data points that were utilized to obtain the derived data $172_1$-$172_n$. For example, a series of points in trajectory data $110_1$ are utilized to compute a climb rate, which is stored as derived data $172_1$, and hence, the series of points in trajectory data $110_1$ can be assigned the climb rate derived data $172_1$.

The vector component 170 can generate an n-dimensional feature vector based upon the features identified/determined for a particular set of trajectory data, e.g., an n-dimensional feature vector $171_1$ for trajectory data $110_1$. Once a trajectory is described by the various available features (e.g., from respective features $161_1$-$161_n$, or a subset thereof, a particular trajectory of a body can be described as a point in n-dimensional space, where n is the number of features used to describe the trajectory. For example, if n-dimensional feature vector $171_1$ is generated with n=9 features (e.g., features $161_1$ comprise a minimum of 9 features), the trajectory data $110_1$ can now be analyzed as a function of a 9-dimensional feature vector, as opposed to the hundreds (thousands, or more) space/time points comprising the trajectory data $110_1$. Further, by expressing trajectory data as an n-dimensional feature vector, any noise effects in the trajectory data can be minimized or negated.

As previously mentioned, once trajectory data is represented as an n-dimensional feature vector, a plurality of operations can be performed which can be computationally difficult/complex to perform on trajectory data alone. For example, the cluster component 180 can compare a plurality of n-dimensional feature vectors (e.g., any of $171_1$-$171_n$, and those n-dimensional feature vectors satisfying particular criteria (e.g., nearest-neighbor, similarity, x-number of features are the same, etc.) those identified n-dimensional feature vectors can be clustered/grouped into bins of similar/related features. In another embodiment, the cluster component 180 can compare one or more points in the n-dimensional feature vectors generated for a plurality of trajectories and identify outlier trajectories based upon points/clusters of points that are a particular distance (e.g., a threshold distance) away from an average value/grouping of points.

Further, the cluster component 180 can be configured to, for any particular n-dimensional feature vector, retrieve (e.g., from data store 120) the trajectory data pertaining to the n-dimensional feature vector. For example, if the n-dimensional feature vector $171_2$ is determined to be of interest, the cluster component 180 can retrieve the trajectory data $110_2$. The presentation component 195 can be configured to present both the values from which the n-dimensional feature vector is formed, as well as the trajectory data (e.g., in the form of a 2 dimensional representation on a display screen).

Further, the n-dimensional feature vectors can be exported to a database (e.g., in data store 120, or an external database, not shown) to enable comparisons between large data sets (e.g., many trajectories) to be performed expeditiously, with minimal computational complexity.

A plurality of software/programming languages can be utilized for the various embodiments presented herein, enabling advantage(s) to be taken of the various processing/operational benefits of a particular software language in a software library. For example, Python programming language can be utilized to process the trajectory data $110_1$-$110_n$ to generate the n-dimensional feature vectors $171_1$-$171_n$. Hence, the feature component 160 and the vector component 170 can be configured to utilize Python programming language. The cluster component 180 and the presentation component 195 can be configured to be programmed utilizing the C++ programming language, wherein advantage can be taken of the ability of the C++ programming language to analyze the various features (e.g., points, trajectories, timestamps, etc.) extracted by the feature component 160 and also the n-dimensional feature vectors $171_1$-$171_n$. Accordingly, advantage can be taken of the C++ programming language with regard to generation of fast analysis algorithms and powerful tools for numerical computation. The Python programming language can be considered to be a "glue" code, enabling smooth interaction between any of the components, e.g., the feature component 160, the vector component 170, the cluster component 180, and/or the presentation component 195. Compilation of the respective programs written with the respective programming languages generates machine code that can be processed by the processor 140, and any other components comprising system 100. It is to be appreciated that while the foregoing discloses Python and C++ programming languages, any programming language can be utilized to facilitate one or more of the embodiments presented herein.

As previously mentioned a presentation component 195 can be utilized to control how any of a trajectory, a feature, other data or information is represented on the display 190. For example, the presentation component 195 can render a plurality of trajectories with one or more graphical representations such as a heat map, a fractal map, a tree map, a choropleth map, etc. E.g., different colors can be utilized to indicate which airport(s) may have a high volume of activity (e.g., based upon number of departures, based upon number of arrivals, etc.) compared to those airports having lesser activity.

Alternatively, a color progression can be utilized by the presentation component 195 to indicate trajectory direction, e.g., at the departure point the trajectory is colored blue, but as the trajectory reaches the destination point the trajectory is colored red. Further, line coloration can be utilized to indicate climb rate, highest altitude, cruising altitude (e.g., level flight), etc.

The presentation component 195 can utilize any technique to plot a trajectory, data, feature, etc., on the display screen 190. For example, line width (thickness) of a trajectory can be utilized to indicate a particular feature, such as the line width is thickened as the trajectory reaches its cruising altitude.

Further, the presentation component 195 can present other information of a map over which the trajectories are presented. For example, other information can include international boundaries, state/local boundaries, cities, land mass(es), ocean(s), etc.

Furthermore, the presentation component 195 can be utilized to generate a movie comprising one or more trajectories $110_1$-$110_n$, features $161_1$-$161_n$, n-dimensional feature vectors $171_1$-$171_n$, and any other pertinent information. Hence, for a series of intervals in time the various data points which comprise the trajectory data $110_1$-$110_n$, can be plotted (e.g., connected by a trajectory line). The movie can be saved in a suitable format, e.g., a movie file format.

As previously mentioned, derived data $172_1$-$172_n$ can be generated from the trajectory data $110_1$-$110_n$. The presentation component 195 can be configured to receive one or more instructions on how the derived data $172_1$-$172_n$ (and any associated data, trajectory data $110_1$-$110_n$, etc.) is to be presented, e.g., color of a line, thickness of a line, color progression, etc.

Further, the presentation component 195 can include one or more components that can control how the various information is presented on the display 190. For example, owing to the shape of the earth, it is not a straightforward task to depict the earth's surface in a two dimensional (2D) space, and rather, various methods of presentation have been derived, e.g., Mercator's Projection. However, no method is perfect, for example, Mercator's Projection enables correct placement of lines of longitude, the lines of latitude become distorted and increases from the Equator to the poles, whereby the landmasses also become distorted as the distance from the Equator increases. Accordingly, to enable correct presentation of one or more trajectories on the 2D display 190, the presentation component 195 can utilize one or more algorithms 197 to depict a region correctly. For example, correct depiction of the longitude line and the latitude lines requires a different manipulation of the lines when displaying a first region located near the equator compared to a second region at the north pole. Hence a first algorithm in the algorithms 197 is utilized to depict the first region and a second algorithm in the algorithms 197 is utilized to depict the second region. The first algorithm and the second algorithm can be selected by the presentation component 195, as required. Further, the presentation component 195 can utilize one or more algorithms 197 to control/configure presentation of a trajectory on a display device (e.g., display 190), wherein the one or more algorithms 197 can compensate/adjust for a feature of the display device, e.g., a 2D screen having a flat profile, a 2D screen having a curved profile, a 3D display device, a spherical display device, etc.

Figure 2:
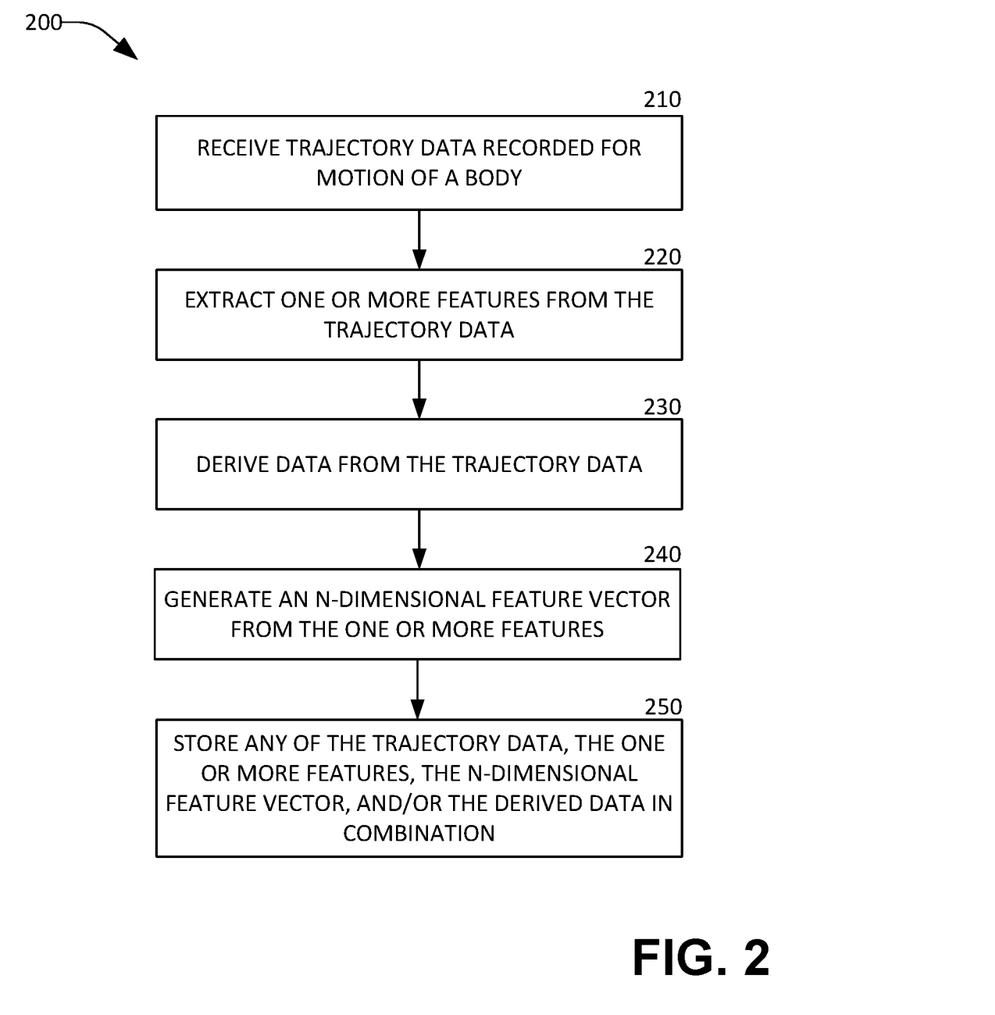
FIG. 2 is a flow diagram illustrating an exemplary methodology for forming a n-dimensional feature vector from trajectory data.
Figure 3:
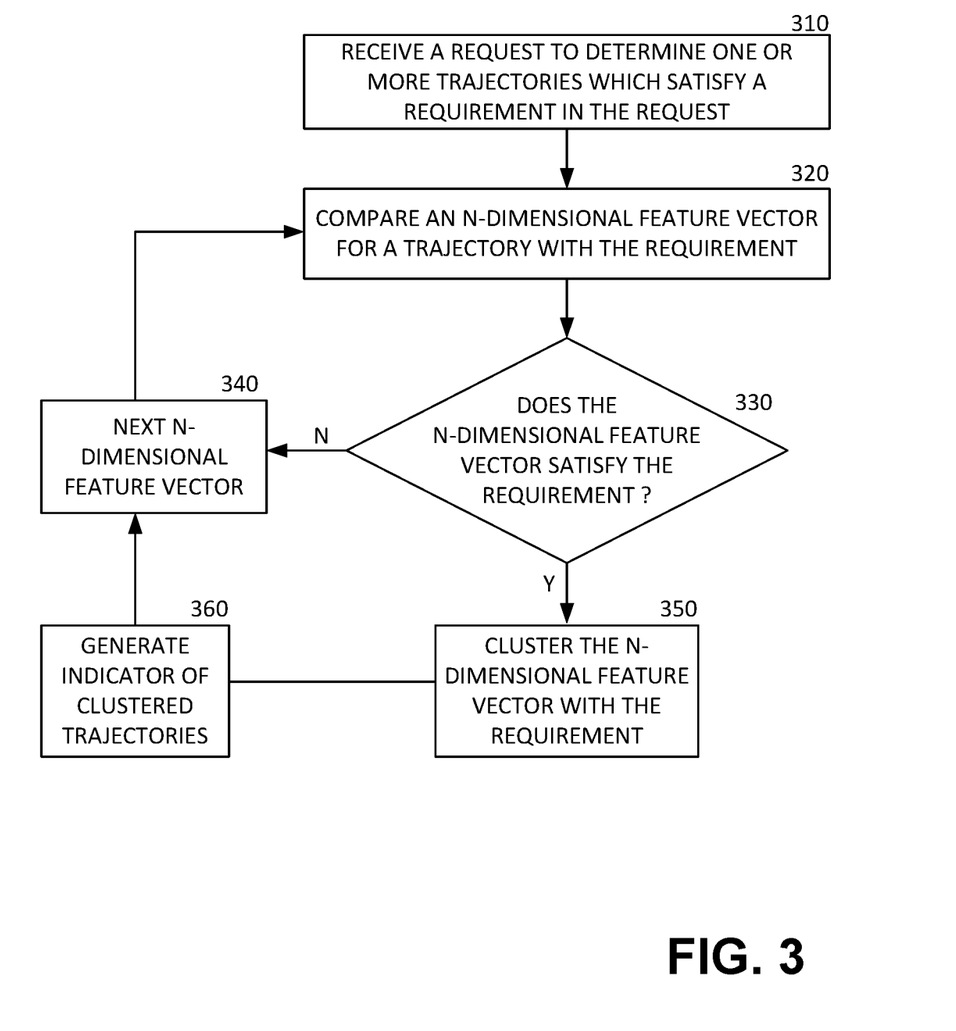
FIG. 3 is a flow diagram illustrating an exemplary methodology for clustering n-dimensional feature vectors and pertinent information.
Figure 5:
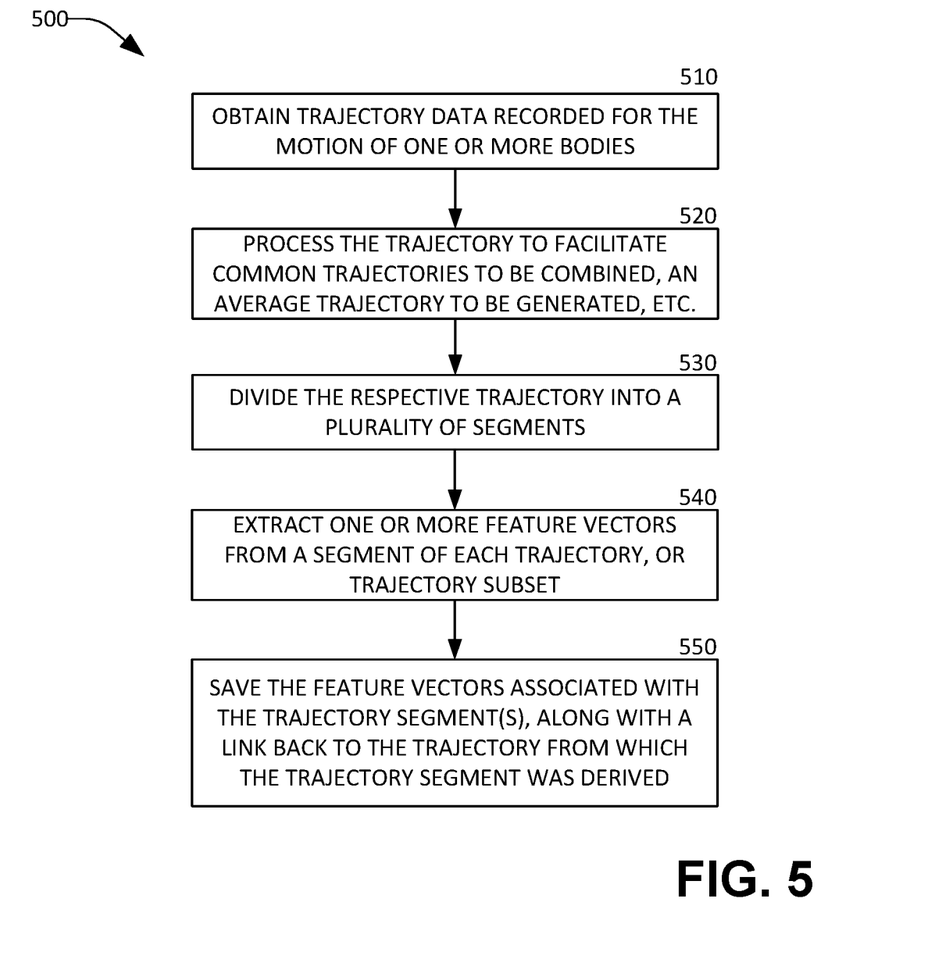
FIG. 5 is a flow diagram illustrating an exemplary methodology for generating a feature vector from a segment of a trajectory.

FIGS. 2, 3 and 5 illustrate exemplary methodologies relating generation of an n-dimensional feature vector from trajectory data. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 2 illustrates a methodology 200 for generating an n-dimensional feature vector and any derived data from trajectory data. At 210, trajectory data relating to motion of a body can be received (e.g., at a computer system).

At 220, one or more features can be extracted from the trajectory data.

At 230, along with extracting various features from the trajectory data, other data can also be derived.

At 240, from the one or more features extracted from the trajectory data, an n-dimensional feature vector can be generated.

At 250, the trajectory data, the one or more features, the n-dimensional feature vector, and/or the derived data, can be stored in combination to enable subsequent analysis of the trajectory data, etc.

Now referring to FIG. 3, an exemplary methodology 300 that facilitates determining whether one or more trajectories match a requirement, and further, enabling matched trajectories to be clustered with the requirement.

At 310, a requirement is received. The requirement can include a n-dimensional feature vector with which the n-dimensional feature vector(s) generated in methodology can be compared with. The requirement can further include a criteria with which any of a feature(s), a derived data, etc., can be compared with.

At 320, per the previously mentioned example, a first n-dimensional feature vector is compared with the n-dimensional feature vector included in the requirement.

At 330, a determination is made regarding whether the first n-dimensional feature vector matches the n-dimensional feature vector included in the requirement.

At 340, in response to determining that the first n-dimensional feature vector does not match the requirement, the next n-dimensional feature vector can be selected for comparison with the n-dimensional feature vector in the requirement.

Returning to 330, in response to determining that the first n-dimensional feature vector matches (or is similar to) the n-dimensional feature vector in the requirement, at 350, the first n-dimensional feature vector can be "clustered" with the required n-dimensional feature vector, and accordingly, and trajectory data, derived data, and other information pertaining to the first n-dimensional feature vector can also be clustered with the first n-dimensional feature vector.

At 360, an indicator can be generated indicating that the first n-dimensional feature vector (and associated trajectory) has been clustered with the required n-dimensional feature vector. The methodology can proceed to the 340, wherein the next n-dimensional feature vector can be selected for comparison with the n-dimensional feature vector in the requirement.

Figure 4:
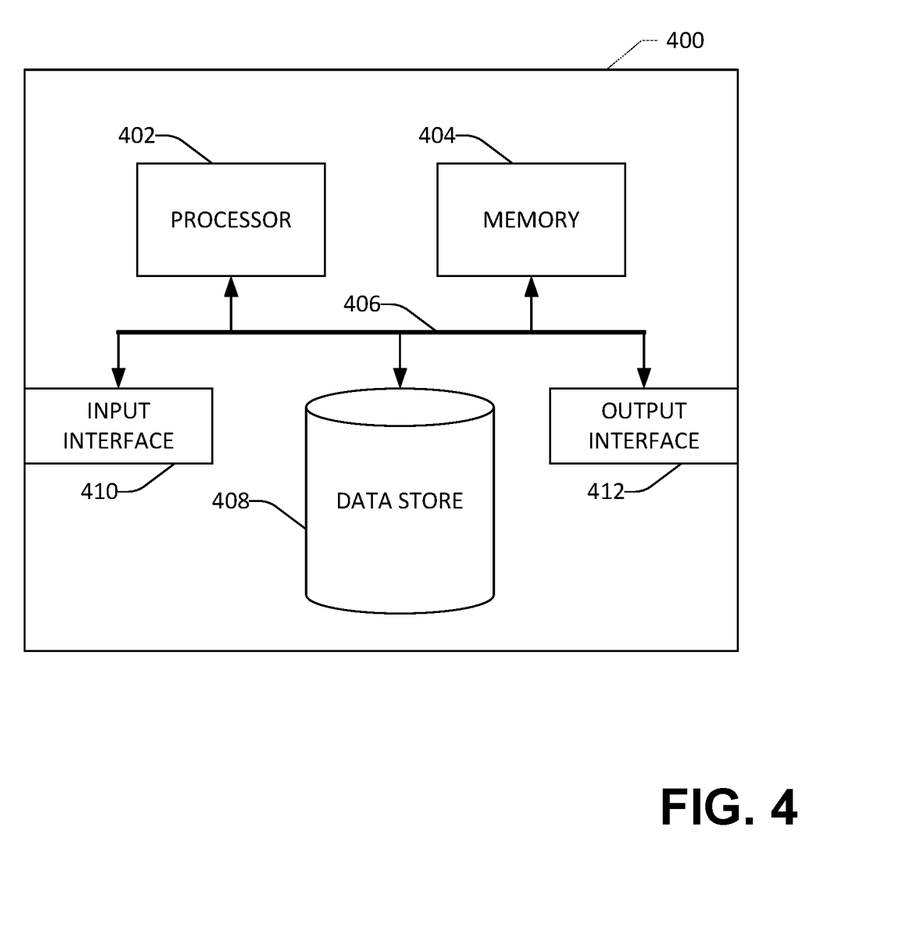
FIG. 4 illustrates an exemplary computing device.

Referring now to FIG. 4, a high-level illustration of an exemplary computing device 400 that can be used in accordance with the systems and methodology disclosed herein is illustrated. For example, the computing device 400 may be utilized to extract one or more features from trajectory data, generate a n-dimensional feature vector from the one or more features, and further compare the n-dimensional feature vector against search/clustering criteria. For example, the computing device 400 can operate as the computing system 130 and/or a portion thereof. The computing device 400 includes at least one processor 402 that executes instructions that are stored in a memory 404. The instructions may be, for instance, instructions for implementing functionality described as being carried out by one or more components discussed above or instructions for implementing one or more of the methods described above. The processor 402 may access the memory 404 by way of a system bus 406. In addition to storing executable instructions, the memory 404 may also store signatures, time-series signals, etc.

The computing device 400 additionally includes a data store 408 that is accessible by the processor 402 by way of the system bus 406. The data store 408 may include executable instructions, test signatures, standard signatures, etc. The computing device 400 also includes an input interface 410 that allows external devices to communicate with the computing device 400. For instance, the input interface 410 may be used to receive instructions from an external computer device, from a user, etc. The computing device 400 also includes an output interface 412 that interfaces the computing device 400 with one or more external devices. For example, the computing device 400 may display text, images, etc., by way of the output interface 412.

Additionally, while illustrated as a single system, it is to be understood that the computing device 400 may be a distributed system. Thus, for instance, several devices may be in communication by way of a network connection and may collectively perform tasks described as being performed by the computing device 400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

In another embodiment, segments of trajectories, and n-dimensional feature vectors based thereon, can be utilized to predict a trajectory and destination of a trajectory which is currently being defined for a body currently in motion, e.g., a trajectory for which data is currently being received in real time. Thus from a history of previously recorded trajectory data (e.g., trajectory data $110_1$-$110_n$), and the various features (e.g., features $161_1$-$161_n$) and the n-dimensional feature vectors (e.g., n-dimensional feature vectors $171_1$-$171_n$) based thereon, it is possible to make a prediction as to a possible trajectory, and ultimate destination, of a body that is currently in motion and for which trajectory data is currently being obtained.

In an embodiment, a sample of a trajectory for an aircraft (or other body in motion) is observed in real-time, before the aircraft reaches its destination, the destination of the aircraft can be predicted based upon extracting a feature vector(s) for the trajectory sample and subsequently searching a database of previously observed feature vectors that were derived from trajectory data previously recorded in the vicinity (nearby, geographically adjacent) of the trajectory data currently being recorded for the aircraft. The historical trajectories which have feature vectors that are nearby the sample trajectory can be collected and weighted based upon their distance in feature space from the sample trajectory. A prediction of where the sample trajectory will end (e.g., a destination such as an airport) can be calculated based upon the destination of the feature vectors identified as being neighboring historical trajectories, along with any weighting(s) applied to facilitate derivation of one or more (e.g., a set) of prioritized possible destinations.

Such an approach can have the following benefits in comparison to conventional analysis of trajectory data:

(a) The prediction of a trajectory still to be mapped out (e.g., flown) and a final destination can be generated faster than a conventional approach as a tailored spatial indexing scheme could return results (e.g., potential destinations) in a time that was logarithmic with respect to the number of historic trajectories in the database. Such an approach is in contrast to other approaches which are focused on comparing individual points between previously recorded trajectory (e.g., an historic trajectory) and the sample trajectory.

(b) Typically, utilized features can be defined by latitude and/or longitude at different fixed points along the trajectory, whether it be an historical trajectory or a sample trajectory. Such an approach would enable a comparison to the physical locations of historical trajectories. However, other features could be used to distinguish trajectories such as time-of-day, day-of-week, time-duration of a sub-trajectory, etc. The time-duration feature can explicitly capture velocity when features that capture/utilize distance are analyzed, and hence can be utilized to separate different types of objects that move at different velocities.

(c) If shape-based features are utilized, prediction can be made based on trajectories that had a similar behavior (e.g., based on the shape of the trajectory), but occurred in a different location. This type of prediction is not possible with a conventional approach.

(d) The ability for the process to return many potential trajectories expeditiously can also be utilized to present results in terms of a picture of all of the historically similar trajectories, and further to visualize (e.g., display) when an observed trajectory fragment (e.g., a known portion, a segment) may have a plurality of potential final destinations.

(e) The ability to expeditiously and efficiently process many potential historical matching trajectories facilitates a quantitative approach for describing the probabilities of many potential destinations in a meaningful manner.

FIG. 5 illustrates a methodology 500 for generating a plurality of sub-trajectories and determining a plurality of feature vectors based thereon. At 510, trajectory data previously recorded for one or more bodies in motion can be obtained.

At 520, one or more features can be generated (extracted) from respective trajectory subsets. For example, the previously recorded trajectory data can comprise of a plurality of recorded trajectories, wherein subsets of the trajectories can be compiled, e.g., based upon origination location, destination location, trajectory route, time-of-day that the trajectories were recorded, day-of-week that the trajectories were recorded, duration of trajectory, velocity data, height data, shape of trajectory, etc. Hence, a plurality of trajectories having associated features can be compiled to form trajectory subsets. In an embodiment, an "average trajectory" can be generated from the respective trajectories in a trajectory subset. Hence, a database of trajectories can be compiled comprising any of recorded trajectories, subsets of trajectories having a common theme(s), an average trajectory that describes a plurality of trajectories.

At 530, any of the trajectories in the database, e.g., an individual trajectory, an average trajectory, etc., can be further divided into a plurality of segments. For example, a plurality of trajectories can be obtained for flights originating at a particular airport, where the plurality of trajectories have a different respective destination airport. A first portion of each trajectory can be obtained, e.g., from between 5 and 20 minutes of initial flight time, wherein the initial 5 minutes are ignored to mitigate effects such as different runways being utilized based upon weather conditions, hence the respective segments are in a period of settled flight and hence any feature vector(s) derived therefrom will be from a stable portion of a flight pattern. Each of the portions can be processed to facilitate one or more features to be extracted therefrom.

At 540, for each respective segment, one or more feature vectors can be generated (extracted), wherein, as previously described, rather than having to analyze all of the respective data points forming the respective segment of a particular trajectory, the trajectory and the trajectory segment can be expressed as one or more feature vectors, which facilitates expeditious identification of a segment of a trajectory (e.g., in historical data) that may correlate to a trajectory segment (e.g., a newly received trajectory for a body in motion) for which a match is to be found (e.g., to enable destination determination).

At 550, each of the trajectory segments can be stored, in conjunction with the feature vector pertaining to that trajectory segment, and further the trajectory segment and the feature vector can be stored with an identifier that links the trajectory segment and/or the feature vector to the trajectory (e.g., full trajectory from origination to destination) from which the trajectory segment and/or the feature vector were derived. Hence, as further described, during a matching operation, if a particular feature vector matches with a feature vector of a newly received trajectory segment, the origination and destination information of the particular feature vector can be applied to the feature vector of the newly received trajectory segment.

Figure 6:
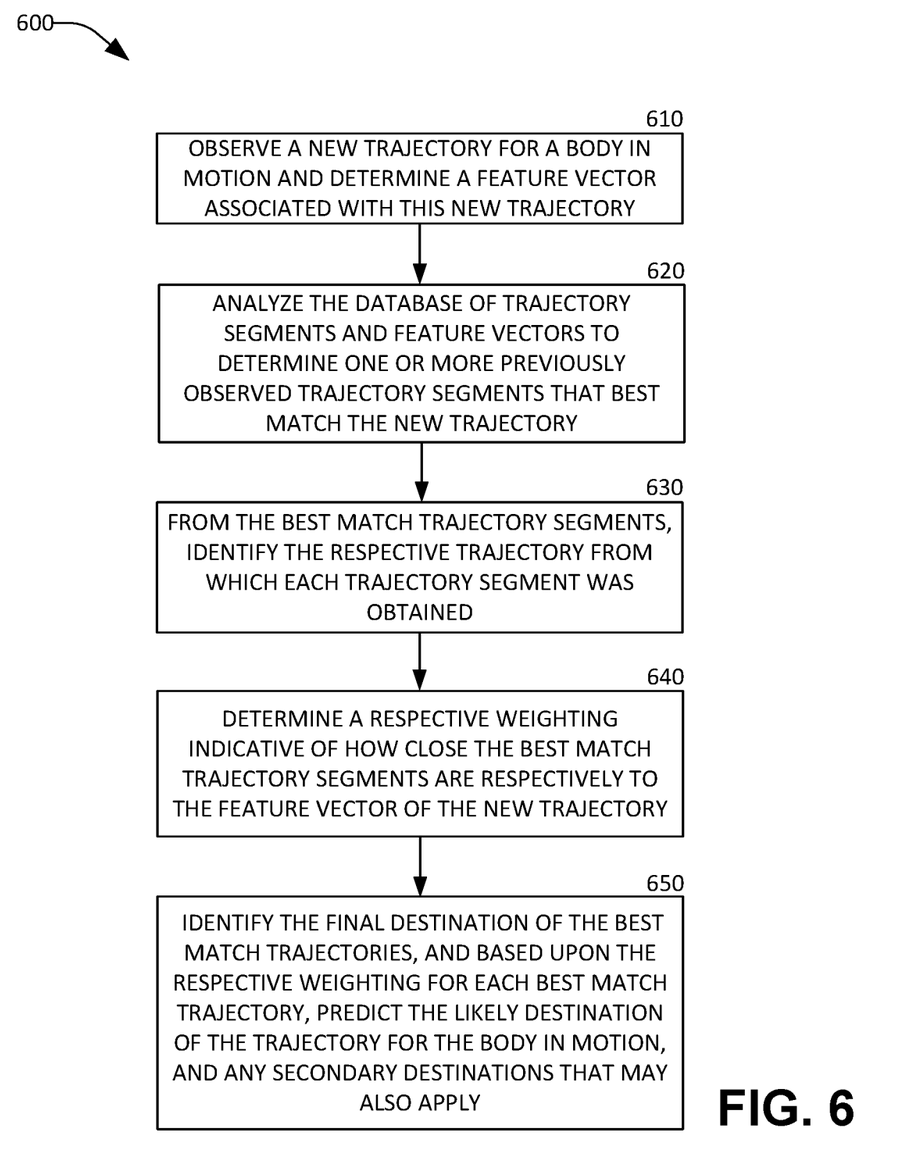
FIG. 6 is a flow diagram illustrating an exemplary methodology for determining a destination of a trajectory based upon other trajectories having a known destination.

FIG. 6 illustrates a methodology 600 for utilizing a feature vector(s) to identify a destination of a trajectory pertaining to a body in motion. At 610, trajectory data is received for a body in motion, wherein the trajectory data is for a segment of an entire trajectory that the body in motion will ultimately define, wherein the trajectory will terminate at a destination, wherein the destination is presently unknown. For the received trajectory segment, a feature vector (e.g., an n-dimensional feature vector) can be determined, as previously described.

At 620, as previously described with reference to FIG. 5, a plurality of known segments can be stored, wherein each respective known segment has been generated from a previously received trajectory for which the origination and destination locations are known. Further, for each known trajectory segment, a feature vector (e.g., a n-dimensional feature vector) has been generated. Hence, when performing a matching operation rather than having to analyze all of the respective data points forming the respective segment of a particular trajectory, the trajectory and the trajectory segment can be expressed as one or more feature vectors, which facilitates expeditious matching of a segment of a previously received trajectory with a received trajectory segment (e.g., the newly received trajectory for a body in motion). A matching operation can be performed, wherein the feature vector of the newly received trajectory segment is compared with the respective feature vectors generated from the plurality of previously stored segments. During the matching operation, the feature vector of the newly received trajectory segment is compared with each feature vector of the previously received trajectories, such that any nearby (adjacent, neighboring) feature vectors in the previously received trajectories that match, or closely match, the feature vector of the are newly received trajectory segment are flagged as a "match".

At 630, from the one or more "best" matches obtained, the respective previously received trajectory from which the matched segment was generated from is identified. As previously mentioned, each previously received trajectory can be stored with any information pertaining thereto, e.g., origination location of the trajectory, destination location of the trajectory.

At 640, a weighting for each matched segment can be determined. In an embodiment, each weighting can be based upon a distance between the received trajectory segment feature vector (e.g., in any of the n-dimensions) and the respective best match segment.

At 650, as mentioned, each previously received trajectory can be stored with information identifying the destination location of the previously received trajectory. Further, with the weighting determined for each matched segment, the respective matched segments that have been matched with the newly received trajectory segment, wherein the matched segments can be listed with their corresponding destination. Hence, the destination from the best match segment (best weighted) can be listed as the "most likely" destination, and the various other segments and destinations are ranked below based upon their respective weightings. Based upon the foregoing, it is possible to predict a destination for a body in motion while it is still en route.

Figure 7:
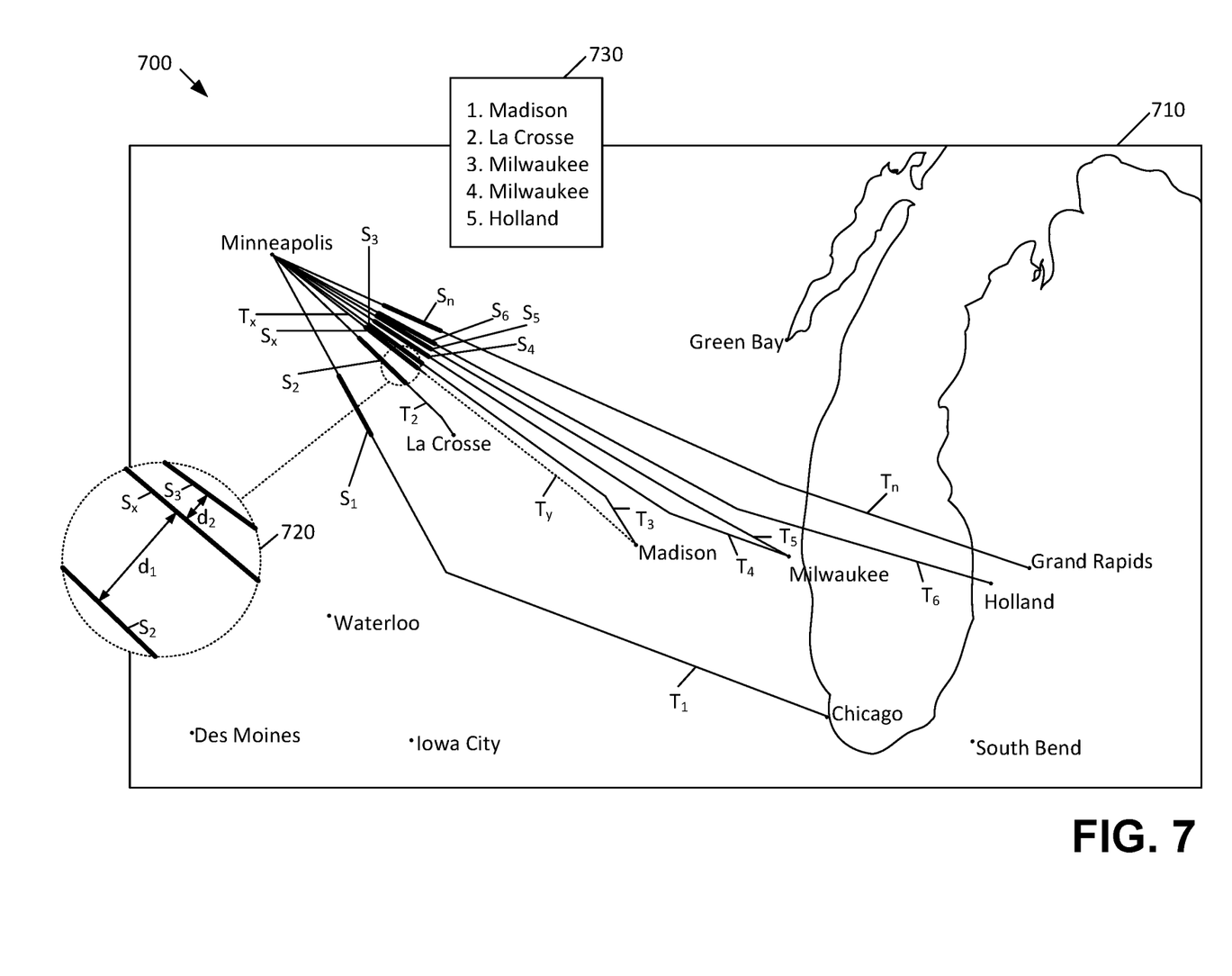
FIG. 7 is a schematic illustrating determination of a destination of a trajectory based upon the respective destinations and feature vectors of similar trajectories, according to an embodiment.

FIG. 7, schematic 700, illustrates a prediction operation being conducted for a trajectory data being received for a body in motion, wherein the body in motion is an aircraft which has recently departed Minneapolis airport and is headed in a generally south east direction. As shown, a plurality of trajectories have been previously recorded, e.g., trajectories originating at Minneapolis to airports at La Crosse (trajectory $T_2$), Madison (trajectory $T_3$), Milwaukee (trajectories $T_4$ and $T_5$), Chicago (trajectory $T_1$), Holland (trajectory $T_6$), and Grand Rapids (trajectory $T_n$). As shown, trajectory data $T_x$ is being collected for the aircraft having a currently unknown destination, wherein a segment $S_x$ has been identified for the trajectory $T_x$ for comparison with other segments generated for the trajectories $T_1$-$T_n$. The segment $S_x$ can be from any portion of the recorded trajectory $T_x$ (e.g., from approx. 15 minutes after flight commencement to 20 minutes after flight commencement). Similar segments are generated for the trajectories $T_1$-$T_n$, e.g., respective segments $S_1$-$S_n$, wherein the destination cities for each segment are identified for each segment. As shown at zoomed portion 720, weightings can be applied to each segment $S_1$-$S_n$, wherein the weightings can be based on correlations between any of the n-dimensional feature vectors associated with each of the respective segments $S_1$-$S_n$, and any of the n-dimensional feature vectors associated with the segment $S_x$. In a simple, exemplary scenario, to facilitate understanding, the weighting can be physical adjacency between vectors, e.g., $S_x$ is closer to $S_3$ than $S_x$ is to $S_2$, and accordingly a weighting $D_2$ will have a higher value than a weighting $D_1$. Hence, a determination can be made that the possible destinations of the trajectory $T_x$ are (in order of a simple weighting based upon physical distance) 1. Madison, 2. La Crosse, 3. a first flight path to Milwaukee, 4. a second flight path to Milwaukee, 5. Holland, etc., as shown in listing 730 of possible destinations. As shown by the hashed line $T_y$, the aircraft did eventually arrive at the best match destination of Madison.

It is to be appreciated that while FIG. 7 presents a scenario where physical adjacency between flights is a strong determinant in the destination of the flight following the trajectory $T_y$, other features can be utilized to enhance the predictive power of identifying a destination of the flight. Other features, as previously mentioned can include a start timestamp, speed of motion, average speed of motion, maximum speed of motion, time of day, day of the week, airspeed, climb rate, curvature average, etc. In the example presented in FIG. 7, if additional features such as time of day and airspeed were also included in the trajectory comparison, one of the other destinations may have been selected by the algorithm if the flight segment $S_x$ had matched the time of day and airspeed more strongly for that destination than others (e.g., Chicago and segment $S_1$, rather than Madison, segment $S_3$). Further, as described, to facilitate preference being given to time of day and airspeed over direction, the respective weightings given to time of day and airspeed can be set higher than that of direction. Using airspeed for example, a slower trajectory originating from Minneapolis and heading in an East-South-East direction may correspond to a smaller plane that would more likely be navigating short haul destinations, e.g., with a destination in Madison, Wis., while a faster airspeed might match a plane(s) that was travelling a greater distance, e.g., to Washington, D.C. Further, the airspeed could be supplemented with altitude, wherein long haul and medium haul flights may fly at a higher altitude than short haul flights. Hence, based upon selection of different features and weightings applied thereto, predictive power can be directed towards a particular set of trajectory conditions being favored over a different set of conditions.

Returning to FIG. 1, system 100 can be configured to perform a prediction operation for newly received trajectory data for a body in motion. As shown, trajectory data $110_x$ can be received at the computing system 130, wherein the trajectory data $110_x$ can be received in real time and the body in motion, for example, is an aircraft, and the trajectory data $110_x$ is a portion of an entire trajectory that will be traversed by the aircraft. In an embodiment, the trajectory data $110_x$ can have the same format as any of the trajectory data $110_1$-$110_n$. In an embodiment, the memory 150 can include a segmentation component 157, wherein the segmentation component 157 can be configured to generate a segment from trajectory data, e.g., a segment $158_x$ from the trajectory data $110_x$. The segment $158_x$ can be supplied to the feature component 160, wherein the feature component 160 can extract one or more features $161_{j-1}$ from the data in the segment $158_x$, wherein the features $161_{j-1}$ can be comparable in nature to features $161_{1-n}$. The features $161_{j-1}$ extracted from the segment $158_x$ can be supplied to the vector component 170, wherein the vector component 170 is configured to generate n-dimensional feature vectors $171_{j-1}$ from the features 1641, wherein the feature vectors $174_1$ can be comparable in nature to n-dimensional feature vectors $171_{1-n}$.

As previously mentioned, a plurality of segments $158_{1-n}$ can be generated from a plurality of the previously captured trajectory data $110_{1-n}$. The respective segments $158_{1-n}$ can be supplied to the feature component 160, wherein the feature component 160 can extract one or more features $161_{v-x}$ from the data in the respective segments $158_{1-n}$, wherein the features $161_{v-x}$ can be comparable in nature to features $161_{1-n}$. The features $161_{v-x}$ extracted from the segments $158_{1-n}$ can be supplied to the vector component 170, wherein the vector component 170 is configured to generate n-dimensional feature vectors $171_{v-x}$ from the features $161_{v-x}$, wherein the n-dimensional feature vectors $171_{v-x}$ can be comparable in nature to n-dimensional feature vectors $171_{1-n}$.

The memory 150 can further include a matching component 184, wherein the matching component 184 can be configured to match the n-dimensional feature vectors $171_{j-1}$ generated from the segment $158_x$ with the n-dimensional feature vectors $171_{v-x}$ generated from the segments $158_{1-n}$ derived from the historical data. As previously described, each of the segments $158_{1-n}$ can have their destinations identified. Hence, based upon the results of the matching component 184, a report 188 (e.g., listing 730) can be generated which lists the destinations of those segments $158_{1-n}$ best matched with the segment $158_x$, wherein the report 188 can list the possible destinations for the trajectory $110_x$, wherein based upon the weightings the respective destinations can be provided with a degree of confidence regarding the probability that a first destination is more likely to be the destination of the trajectory $110_x$ than a second destination. The report 188 can be presented on the display 190. Accordingly, per the various embodiments presented herein, it is possible to predict a destination of an in-process trajectory based upon matching with historical data, wherein the matching utilizes n-dimensional feature vector techniques.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method for predicting a destination of an aircraft, comprising:
selecting a first segment of a current trajectory, the current trajectory relates to an aircraft currently in motion, wherein the current trajectory originated at a known first location and terminates at a currently unknown destination, the first segment comprising a plurality of known positions of the aircraft during a first period of time;
generating a current feature vector that is representative of the first segment based upon the plurality of known positions of the aircraft;
obtaining a plurality of historic feature vectors that respectively pertain to a plurality of historic trajectories that originated from the first location, wherein each historic feature vector in the plurality of historic feature vectors has a different destination;
comparing the current feature vector with the each historic feature vector in the plurality of historic feature vectors;
based upon the comparing, determining a first feature vector in the plurality of historic feature vectors has a trajectory that best matches the current trajectory;
identifying a destination defined for the first feature vector; and
presenting, as a predicted destination of the current trajectory, the identified destination defined for the first feature vector.

2. The method of claim 1, wherein the predicted destination is presented with an indication of a degree of certainty that the predicted destination is the destination of the current trajectory.

3. The method of claim 1, wherein the each historic feature vector in the plurality of historic feature vectors is assigned a weighting, the weighting being based upon a respective distance in feature space of the respective vector from the current feature vector, and wherein determining that the first feature vector has a trajectory that best matches the current trajectory is based upon the weightings of the historic feature vectors.

4. The method of claim 3, further comprising adjusting the weighting assigned to the each historic feature vector based upon at least one of time-of-day a respective subset of historic trajectories were recorded, day-of-week the respective subset of historic trajectories were recorded, a time duration of the respective subset of historic trajectories, or one or more velocities associated with the respective subset of historic trajectories.

5. The method of claim 1, wherein determining that the first feature vector has a trajectory that best matches the current trajectory is based upon a degree of correlation between the current feature vector and the first feature vector, the method further comprising:
based upon the comparing of the current feature vector with the each historic feature vector in the plurality of historic feature vectors, determining a degree of correlation between a second feature vector in the plurality of historic feature vectors and the current feature vector, wherein the degree of correlation between the second feature vector and the current feature vector is not as high as the degree of correlation between the first feature vector and the current feature vector;
identifying a destination defined for the second feature vector; and
presenting, as a potential destination of the current trajectory, the identified destination defined for the second feature vector, wherein the identified destination defined for the second feature vector is presented with an indication that the identified destination defined for the second feature vector has a lower degree of confidence than the identified destination defined for the first feature vector.

6. The method of claim 5, wherein the each historic feature vector in the plurality of historic feature vectors is respectively generated from one or more trajectories having the same first originating location and the same destination location, such that the first feature vector is obtained from one or more trajectories having the same first originating location and the same first destination location and the second feature vector is obtained from one or more trajectories having the same first originating location and the same second destination location.

7. The method of claim 1, wherein the plurality of historic feature vectors are respectively determined from a segment of their respective trajectory, each segment of the plurality of historic feature vectors correlating to the first segment of the current trajectory with regard to at least one of segment start point, segment end point, length of segment, or segment duration.

8. A system comprising:
a processor; and
memory that comprises components that are executed by the processor, the components comprising:
a segmentation component configured to select a first segment of a current trajectory, the current trajectory relates to an aircraft currently in motion, wherein the current trajectory originated at a known first location and terminates at a currently unknown destination, the first segment comprising a plurality of known positions of the aircraft during a first period of time;
a feature component configured to generate a current feature vector that is representative of the first segment based upon the plurality of known positions of the aircraft;
a matching component configured to:
obtain a plurality of historic feature vectors that respectively pertain to a plurality of historic trajectories that originated from the first location, wherein each historic feature vector in the plurality of historic feature vectors has a different destination;
compare the current feature vector with the each historic feature vector in the plurality of historic feature vectors;
based upon the comparison, determine a first feature vector in the plurality of historic feature vectors has a trajectory that best matches the current trajectory; and
identify a destination defined for the current feature vector; and
a presentation component configured to present, as a predicted destination of the current trajectory, the identified destination defined for the first feature vector.

9. The system of claim 8, wherein the predicted destination is presented with an indication of a degree of certainty that the predicted destination is the destination of the current trajectory.

10. The system of claim 8, wherein the each historic feature vector in the plurality of historic feature vectors is assigned a weighting, the weighting being based upon a respective distance in feature space of the respective vector from the current feature vector, and wherein the matching component is configured to determine that the first feature vector has a trajectory that best matches the current trajectory based upon the weightings of the historic feature vectors.

11. The system of claim 10, further comprising adjusting the weighting assigned to the each historic feature vector based upon at least one of time-of-day a respective subset of historic trajectories were recorded, day-of-week the respective subset of historic trajectories were recorded, a time duration of the respective subset of historic trajectories, or one or more velocities associated with the respective subset of historic trajectories.

12. The system of claim 8, wherein the matching component is configured to determine that the first feature vector has a trajectory that best matches the current trajectory based upon a degree of correlation between the current feature vector and the first feature vector, and wherein the matching component is further configured to, based upon the comparing of the current feature vector with the each historic feature vector in the plurality of historic feature vectors, determine a degree of correlation between a second feature vector in the plurality of historic feature vectors and the current feature vector, wherein the degree of correlation between the second feature vector and the current feature vector is not as high as the degree of correlation between the first feature vector and the current feature vector;
  identifying a destination defined for the second feature vector; and
  presenting, as a potential destination of the current trajectory, the identified destination defined for the second feature vector, wherein the identified destination defined for the second feature vector is presented with an indication that the identified destination for the second feature vector has a lower degree of confidence than the identified destination for the first feature vector.

13. The system of claim 12, wherein the each historic feature vector in the plurality of historic feature vectors is respectively generated from one or more trajectories having the same first originating location and the same destination location, such that the first feature vector is obtained from one or more trajectories having the same first originating location and the same first destination location and the second feature vector is obtained from one or more trajectories having the same first originating location and the same second destination location.

14. The system of claim 8, wherein the plurality of historic feature vectors are respectively determined from a segment of their respective trajectory, each segment of the plurality of historic feature vectors correlating to the first segment of the current trajectory with regard to at least one of segment start point, segment end point, length of segment, or segment duration.

15. A computing device comprising:
  a processor; and
  memory that comprises instructions that, when executed by the processor, cause the processor to perform acts comprising:
    selecting a first segment of a current trajectory, the current trajectory relates to an aircraft currently in motion, wherein the current trajectory originated at a known first location and terminates at a currently unknown destination, the first segment comprising a plurality of known positions of the aircraft during a first period of time;
    generating a current feature vector that is representative of the first segment based upon the plurality of known positions of the aircraft;
    obtaining a plurality of historic feature vectors that respectively pertain to a plurality of historic trajectories that originated from the first location, wherein each historic feature vector in the plurality of historic feature vectors has a different destination;
    comparing the current feature vector with the each historic feature vector in the plurality of historic feature vectors;
    based upon the comparing, determining that a first feature vector in the plurality of historic feature vectors has a trajectory that best matches the current feature trajectory;
    identifying a destination defined for the first feature vector; and
    presenting, as a predicted destination of the current trajectory, the identified destination defined for the first feature vector.

16. The computing device of claim 15, wherein the predicted destination is presented with an indication of a degree of certainty that the predicted destination is the destination of the current trajectory.

17. The computing device of claim 15, wherein the each historic feature vector in the plurality of historic feature vectors is assigned a weighting, the weighting being based upon a respective distance in feature space of the respective vector from the current feature vector, and wherein determining that the current feature vector has a trajectory that best matches the current trajectory is based upon the assigned weightings.

18. The computing device of claim 17, further comprising adjusting the weighting assigned to the each historic feature vector based upon at least one of time-of-day the respective subset of historic trajectories were recorded, day-of-week the respective subset of historic trajectories were recorded, a time duration of the respective subset of historic trajectories, or one or more velocities associated with the respective subset of historic trajectories.

19. The computing device of claim 15, wherein determining that the first feature vector has a trajectory that best matches the current trajectory is based upon a degree of correlation between the current feature vector and the current feature vector, the method further comprising:
  based upon the comparing of the current feature vector with the each historic feature vector in the plurality of historic feature vectors, determining a degree of correlation between a second feature vector in the plurality of historic feature vectors and the current feature vector, wherein the degree of correlation between the second feature vector and the current feature vector is not as high as the degree of correlation between the first feature vector and the current feature vector;
  identifying a destination defined for the second feature vector; and
  presenting, as a potential destination of the current trajectory, the identified destination defined for the second feature vector, wherein the destination defined by the second feature vector is presented with an indication that the destination defined by the second feature vector has a lower degree of confidence than the destination defined by the first feature vector.

20. The computing device of claim 19, wherein the each historic feature vector in the plurality of historic feature vectors is respectively generated from one or more trajectories having the same first originating location and the same destination location, such that the first feature vector is obtained from one or more trajectories having the same first originating location and the same first destination location and the second feature vector is obtained from one or more trajectories having the same first originating location and the same second destination location.

\* \* \* \* \*